Nov. 15, 1949 — A. P. GLENNY — 2,488,286
AUTOMATIC CONTROL SYSTEM FOR DIRIGIBLE CRAFT
Filed Feb. 23, 1946 — 3 Sheets-Sheet 3

INVENTOR
ARTHUR P. GLENNY
his ATTORNEY.

UNITED STATES PATENT OFFICE 2,488,286

AUTOMATIC CONTROL SYSTEM FOR DIRIGIBLE CRAFT

Arthur Philip Glenny, Hanworth, England, assignor to The Sperry Gyroscope Company, Ltd., Brentford, England Application February 23, 1946, Serial No. 649,602
In Great Britain November 22, 1944

Section 1, Public Law 690, August 8, 1946
Patent expires November 22, 1964

9 Claims. (Cl. 318—489)

This invention relates to automatic systems for operating a control surface of a dirigible craft, such as the rudder or ailerons of an aircraft, so as to return the craft to a set course or attitude after deviation therefrom.

A number of control systems of this character have been proposed in which the deflection of the control surface is determined at any instant not solely by the deviation of the craft from set course or attitude at that instant but also by one or more auxiliary control quantities dependent upon the angular rates of movement of the craft. In particular, control systems have been proposed in which the total control quantity comprised terms in the deviation, the angular velocity and the angular acceleration of the craft.

The inclusion of an acceleration term in the control is of value in sudden disturbances such as gusts of wind, because these disturbances can impart a large angular acceleration to the craft before any appreciable angular velocity is attained. In such case an acceleration term in the control will bring about action to check the effect of the disturbance in diverting the craft from its course much earlier than would be possible if deviation and/or angular velocity terms were used alone.

It is necessary, however, not only to check the deviation of the craft from its course or attitude, but also subsequently to return the craft to its course or attitude. For this purpose it is necessary to apply angular acceleration to the craft in the direction that returns it towards the true heading or attitude which acceleration is in the reverse sense to that experienced by the craft in its duration under the influence of the disturbing forces or torques. A disadvantage in the use of an acceleration term in the control then appears, since the acceleration term will oppose the angular acceleration of the craft towards the correct attitude and thus will delay the correcting action of the control.

The object of the present invention is to provide an automatic control system of the character described having improved characteristics in comparison with those hitherto used and in particular to gain advantage by using an acceleration term in the control whilst avoiding the disadvantage referred to.

A further disadvantage of previous systems employing a combination of displacement, velocity and acceleration, controls can be appreciated by considering the ideal manner in which a control system for a craft should return the craft to its course or attitude after a deviation therefrom due to a disturbance. It is desirable that the craft should be returned quickly to its course, but should not overshoot or hunt. This requires that the return movement should be braked as the craft approaches the course. Such braking is produced by what is known as "check-rudder." This "check rudder" is applied in such systems by the control term in the velocity which exerts damping effect by acting in opposition to the velocity of the craft towards or from its correct course or attitude. When the craft is approaching its correct course, the displacement control term falls towards zero, and the velocity term is consequently able to exert its effect more efficiently in braking the craft, and thus operates to apply the necessary "check rudder." However, this desirable braking effect is an acceleration away from the course, and the acceleration control term as used in previous systems opposes it, and thus opposes the "check rudder" action exerter by the velocity control term. A further object of the invention in some of its forms, is so to employ an acceleration control term that, while it checks initial acceleration of the craft away from its course or attitude through the disturbing causes, it does not have the disadvantage of opposing the "check rudder" action exerted by the velocity term in the final stages of the return of the craft towards its course or attitude, whereby a system is realised having improved performance.

The invention consists in an automatic system for controlling the motion of a dirigible craft about an axis in order to maintain a desired direction of motion or attitude of the craft operating by causing a control surface to be deflected in a manner determined at every instant by a control quantity made up of one or more control terms, wherein a control term is employed dependent on the angular acceleration of the craft about the axis of control, and wherein means are provided for so controlling, in dependence on one or more of the remaining control terms, the manner in which the angular acceleration is rendered operative as to oppose the angular acceleration of the craft away from its desired direction of motion or attitude that occurs at the beginning of a disturbed motion resulting from the action of a disturbing cause, but not to oppose an angular acceleration of the craft back towards its desired direction of motion or attitude resulting in a later stage of the disturbed motions from the correcting deflection of the control surface.

The invention consists also in a system for controlling the motion of a dirigible craft about an axis in order to maintain a desired direction of motion or attitude of the craft, operating by causing a control surface to be deflected in a manner determined at every instant by a control quantity, characterised by the fact that selective means are employed for selectively constituting the control quantity out of a plurality of control terms, one of which is a control term in the angular acceleration of the craft about the axis, said selective means operating to include the angular acceleration term in the control quantity in the sense appropriate to deflect the control surface to oppose the angular acceleration of the craft when the craft is accelerating away from its desired direction of motion or attitude in the initial stages of a disturbed motion resulting from the action of the disturbing cause, but not to include the angular acceleration term, or to include it in the sense appropriate to assist the acceleration of the craft when the craft is accelerating back towards its desired direction of motion or attitude in a later stage of the disturbing motion, as a result of the correcting deflection of the control surface.

According to a subsidiary feature of the invention, each supervision instrument controls two relay devices which operate selectively according to the sense of the indication of the supervising instrument, so that there are two sets of relays whose outputs are opposed to one another, and each of the relays associated with the acceleration-sensitive instrument is controlled also by an auxiliary device operated by the output from a selection or combination of the opposing relays and adapted when so operated to prevent the normal action of the relay which it controls.

Other features of the invention will appear from the following description with reference to the accompanying drawings and are pointed out in the claims.

In the accompanying drawings—

For the sake of definiteness, the apparatus illustrated in the accompanying drawings will be described as concerned only with the control of the direction in azimuth of a craft by means of its rudder. That is to say the systems to be described are steering systems. It will be evident, however, that these systems can be applied to the control of an aircraft either about its fore-and-aft (roll) axis or about its transverse (pitch) axis, or in fact to the positional control of any heavy object of a sensitive control device.

Figure 1:
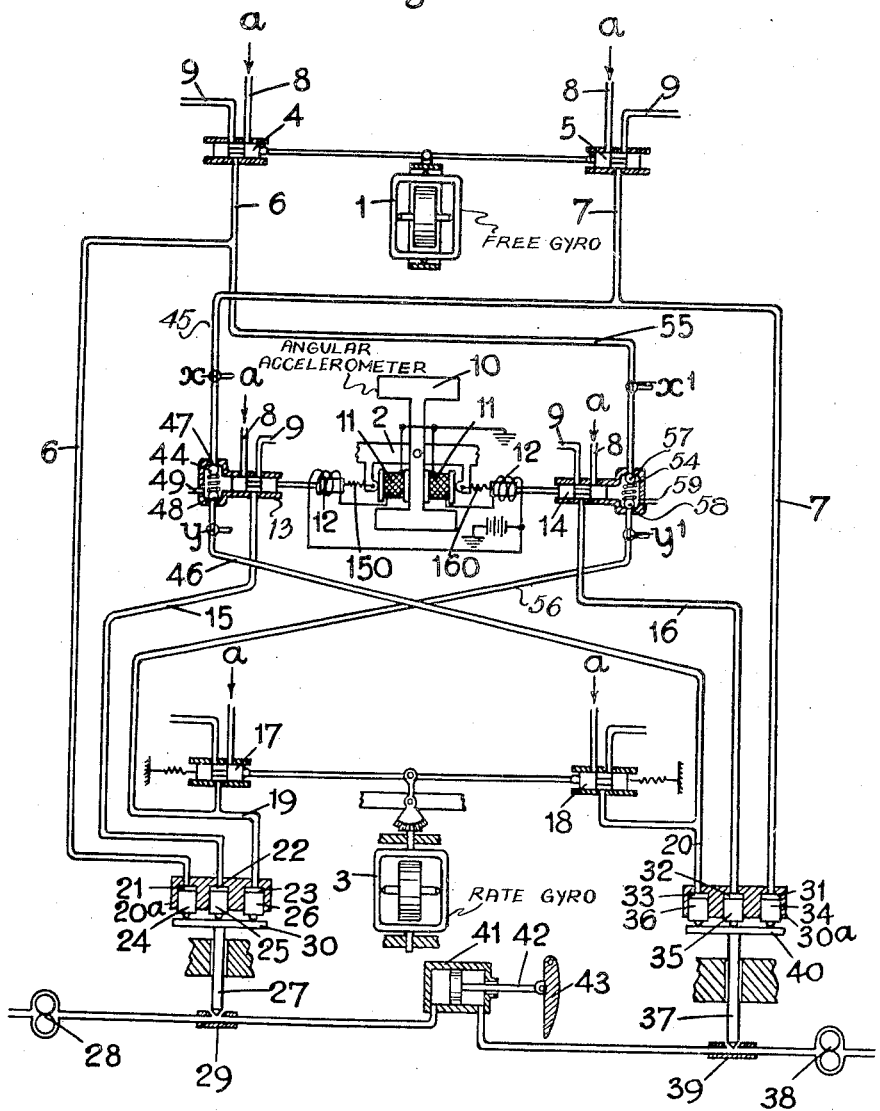
Figure 1 illustrates a system in which the control quantity includes a displacement term acting to oppose angular displacement of the craft, and a velocity term opposing the angular velocity of the craft, and in which an acceleration term opposing the angular acceleration of the craft is also included only when the displacement, velocity, and acceleration of the craft are all in the same sense.

Referring first to Figure 1, the system there illustrated comprises three supervising instruments, namely a free gyro 1, an angular accelerometer 2 and a rate gyro 3.

The free gyro is arranged in known manner to indicate deviations from a fixed course in azimuth and is coupled to two hydraulic pressure-controlling valves 4 and 5 which act as relay devices. Each of the valves 4 and 5 has an inlet 8 leading to a constant hydraulic pressure supply and an outlet 9 for returning surplus fluid to a reservoir or sump. The valve 4 delivers pressure to a conduit 6 and the valve 5 delivers pressure to a conduit 7.

The valves 4 and 5 are adjusted so that when the instrument 1 gives a null indication both conduits 6 and 7 are shut off from the pressure supply and connected to the outlets 9 so that no pressure is produced in either conduit. When the instrument 1 indicates a deviation from true course, both valves 4 and 5 move through a distance dependent upon the amount of the deviation but only one of them is effective (according to the sense of the deviation) to open its inlet 8 and to close its outlet 9 by an amount dependent upon the amount of the deviation. Thus the relay valves 4 and 5 operate selectively to produce a pressure in one or other of the conduits 6 and 7 according to the sense of the indication given by the supervising instrument 1 and the value of the pressure produced is dependent upon the magnitude of the indication given by the supervising instrument.

The accelerometer 2 may consist of a mass 10 pivotally mounted upon a vertical (turn axis) of the craft and adapted to act on two oppositely arranged electrical resistance devices 11 of any suitable known type constructed so that their electrical resistances depend upon the mechanical pressure applied to them by the mass 10. Each of the resistances 11 is connected at one end to earth and at the other end to one of two solenoids 12 which are connected in common to an earthed battery as indicated on the drawing so that each solenoid 12 is energised to a degree dependent upon the resistance value of one of the resistances 11.

The two solenoids 12 operate two hydraulic valves 13 and 13 against the action of springs 150 and 160 so that both valves are moved in accordance with the indications of the supervising instrument 2. The valves 13 and 14 are similar in construction to the valves 4 and 5. They have inlet connections 8 and outlet connections 9 similar to those of the valves 4 and 5 and they control the hydraulic pressure produced in conduits 15 and 16 respectively.

The valves 13 and 14 are adjusted so that when the mass 10 applies equal pressures to the two resistance devices 11 (null indication of angular acceleration), no pressure is delivered to either conduit 15 or 16. When the pressure applied to one resistance 11 exceeds that of the other (indicating an angular acceleration of the craft) both valves 13 and 14 move, but only one of them moves in the appropriate direction to cause pressure to be delivered to the conduit 15 or 16. The valves 13 and 14 thus act selectively to produce pressure in one or other of the conduits 15 and 16 according to the sense of the indication given by the supervising instrument and the selected valve regulates the pressure in accordance with the magnitude of the indication.

The rate gyro 3 is arranged in known manner to indicate the angular rate of movement of the craft about a vertical (turn) axis and is coupled to two hydraulic valves 17 and 18 similar to the valves 4 and 5 and adapted to operate selectively to produce a pressure in one or other of two conduits 19 or 20 according to the sense of the indication given by the rate gyro. The operative valve 17 or 18 also regulates the pressure produced in accordance with the magnitude of the indication given by the rate gyro.

The pressure conduits 6, 15 and 19 controlled by the valves 4, 13 and 17 which respond to indications of the supervising instruments in one sense (say clockwise) are connected to a totalising device 20a comprising cylinders 21, 22 and 23 containing pistons 24, 25 and 26 which act upon a common pressure plate 30 so that their combined pressures are transmitted to a hydraulic pressure regulating valve 27. The valve 27 controls the delivery pressure of a hydraulic pump 28 by controlling the escape of fluid through a variable by-pass or escape orifice 29, the waste fluid which escapes through this orifice being returned by suitable means (not shown) to a sump or reservoir from which the pump 28 takes its supply.

The pressure conduits 7, 16 and 20 controlled by the valves 5, 14 and 18 which respond to the indications of the supervising instruments in the opposite sense to that previously referred to (say anti-clockwise) are connected to a totalising device 30a comprising cylinders 31, 32 and 33 containing pistons 34, 35 and 36 which act upon a common pressure plate 40 so that their combined pressures are applied to a regulating valve 37. The valve 37 is exactly similar to the valve 27 and controls the delivery pressure of a pump 38 similar to the pump 28.

The pressures delivered by the pumps 28 and 38 and controlled by the regulating valves 27 and 37 are applied in opposite senses to a double acting hydraulic actuating device 41 which is coupled by suitable transmission mechanism (represented by the push-rod 42) to a rudder 43.

It will be appreciated from the foregoing description that the set of relay valves 4, 13 and 17 on the one hand and the set of relay valves 5, 14 and 18 on the other hand act in opposition to one another through the totalising devices 20a and 30a and double acting hydraulic actuating device 41.

The relay valve 13 is provided with a pressure chamber 44 arranged so that pressure delivered to this chamber tends to move the valve against the action of the associated solenoid 12 so as to prevent the development of pressure in the conduit 15. The pressure chamber 44 of the relay valve 13 is connected by conduits 45 and 46 to the conduits 7 and 20 which receive the outputs of the opposing relay valves 5 and 18. Check valves 47 and 48 are arranged to prevent pressure fluid delivered to the chamber through either of the conduits 7 and 20 from escaping through the other. A bleed orifice 49 is provided to allow pressure fluid to escape from the chamber 44 so that the pressure in this chamber falls to zero when both conduits 7 and 20 cease to supply pressure.

The relay valve 14 is provided with a pressure chamber 54 similar to the chamber 44 and is connected by conduits 55 and 56 to the conduits 6 and 19 controlled by the valves 4 and 17. It is equipped with check valves 57 and 58 corresponding to the check valves 47 and 48 and has a bleed orifice 59.

In the operation of the system illustrated in Figure 1, any deviation of the craft from the set course causes the valves 4 and 5 to be operated in accordance with the indication of the supervising instrument 1 so that a pressure dependent upon the deviation is delivered to one or other of the conduits 6 or 7 according to the sense of the deviation. This pressure is transmitted by the piston 24 or 34 to the pressure regulating valve 27 or 37 and tends to produce a deflection of the rudder 43 in the appropriate direction to correct the deviation. This action provides the deviation term in the control and causes the craft to seek the true course.

The valves 17 and 18 respond to the indication of the supervising instrument 3 so that a pressure dependent upon the angular velocity of the craft is produced in one or other of the conduits 19 or 20 according to the sense of the angular velocity. This pressure is transmitted by the piston 26 or 36 to the valve 27 or 37 and tends to produce a deflection of the rudder 43 in the direction to reduce the angular velocity of the craft. This action provides a velocity term in the control and has a damping effect tending to prevent "hunting." It may assist or oppose the deviation term at any instant according to whether the angular deviation of the craft is increasing or decreasing at that instant.

The valves 13 and 14 respond to the indications of the supervising instrument 2 (except when prevented as hereinafter described) so that a pressure dependent upon the angular acceleration of the craft is produced in one or other of the conduits 15 and 16 according to the sense of the angular acceleration. This pressure is transmitted by the piston 25 or 35 to the valve 27 or 37 and tends to deflect the rudder 43 in direction to reduce the angular acceleration. This action provides an acceleration term in the control and is of great value in checking the initial angular acceleration of the craft produced by a sudden disturbance such as a gust of wind. At later stages in the disturbance, however, the craft receives angular acceleration in opposite sense to the deviation and/or angular velocity of the craft. At such times the pressure chamber 44 or 54 comes into action to prevent the acceleration term from acting. Operation of either of the valves 4 or 17 causes pressure output to be delivered to the chamber 54. Similarly pressure output from either of the valves 7 or 18 is delivered to the chamber 44. Consequently the valve 14 cannot operate when its effect would be to oppose that of either of the valves 4 or 17 and the valve 13 cannot operate when its effect would be to oppose that of either of the valves 5 and 18. Thus the acceleration term is prevented from acting when its effect would be to oppose either the deviation term or the velocity term.

The conduits 45 and 55 may be fitted with stop cocks $x$ and $x'$ and the conduits 46 and 56 with stop cocks $y$ and $y'$ so that the action of the system can be modified. If the cocks $x$ and $x'$ are closed (the cocks $y$ and $y'$ being open) the acceleration term in the control is active except when its effect would be to oppose the velocity term. If the cocks $x$ and $x'$ are opened and the cocks $y$ and $y'$ closed, the acceleration term is active except when its effect would be to oppose the deviation term.

Figure 2:
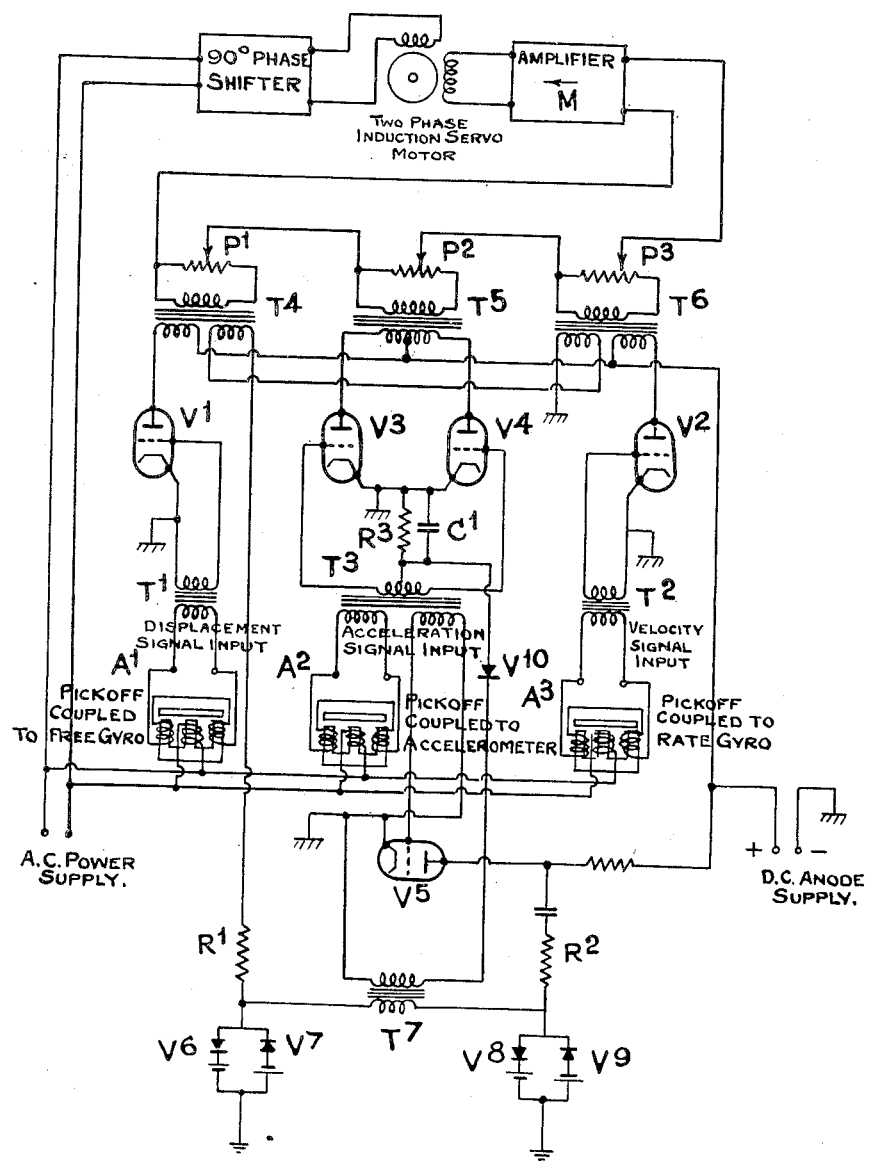
Figure 2 illustrates a system in which the control quantity includes a displacement term acting to oppose the angular displacement of the craft, and a velocity term opposing the angular velocity of the craft, and in which an acceleration term is in the same sense as the resultant of the displacement and velocity terms.

The arrangement shown in Figure 2 of the drawings comprises a free gyro (not shown) associated with a co-operating pick-off device $A_1$, a rate gyro (not shown) associated with a co-operating pick-off device $A_3$ and an angular accelerometer (not shown) associated with a co-operating pick-off device $A_2$, the said devices being adapted to produce signals respectively corresponding to the instantaneous displacement, velocity, and acceleration of the craft about a control axis, in known manner. These signals are applied to the primary winding of transformers $T_1$, $T_2$, $T_3$, whose main secondary winding outputs are respectively applied to the control electrodes of amplifying tubes $V_1$, $V_2$ and the push-pull pair of tubes $V_3$, $V_4$. The transformer $T_3$ is provided with an additional secondary winding whose use will be explained later. The anode outputs of tubes $V_1$, $V_2$ are supplied to the interconnected primary windings of two transformers $T_4$, $T_6$, and the anode outputs of tubes $V_3$, $V_4$, are connected in push-pull to the centre-tapped primary winding of the transformer $T_5$, the centre-tap and the primary winding of the other two transformers being connected to the anode supply of the tubes. The outputs of the secondary windings of transformers $T_4$, $T_6$, $T_5$ are supplied to potentiometers $P_1$, $P_3$, $P_2$, connected together in such a manner that the voltages across the potentiometers are added algebraically, the relative amplitudes of the separate voltages being adjustable by the potentiometer settings, and the combined output being supplied to an amplifier (M). Each of the transformers $T_4$, $T_6$ is provided with an additional secondary winding whose use will now be explained.

The additional secondary windings of transformers $T_4$, $T_6$ are connected together in such a manner that their resultant output is proportional to the algebraic sum of their inputs, and this resultant output is supplied to a load-resistor $R_1$ connected in series with limiting device $V_6$, $V_7$ suitably biased. The additional secondary winding of transformer $T_3$ is connected to the control electrode of an amplifying tube $V_5$, whose anode output is supplied through a blocking capacitor to a load resistor $R_2$ connected in series with a limiting device $V_8$, $V_9$ suitably biased. The ends of the load resistors $R_1$, $R_2$ adjacent to the limiting devices $V_6$, $V_7$ and $V_8$, $V_9$ are connected one to each terminal of the primary winding of transformer $T_7$, and the output of the secondary winding of transformer $T_7$ is supplied through rectifier $V_{10}$ to smoothing circuit $R_3$, $C_1$, and to the control electrodes of the tube $V_3$, $V_4$ via the centre-tap of the main secondary winding of transformer $T_3$.

The output of the amplifier M is supplied in known manner to control a servo-motor to deflect the control surface of the craft in such a manner as to apply a force or torque to the craft tending to restore it to its correct course.

The operation of the system is as follows:

The displacement, velocity, and acceleration signals provided by pick-offs $A_1$, $A_3$, $A_2$, after amplification in tubes $V_1$, $V_2$, and push-pull tubes $V_3$, $V_4$, are algebraically added in the transformer-potentiometer arrangements, $T_4$, $P_1$, $T_6$, $P_3$, $T_5$, $P_2$, and the output is applied to the amplifier (M). If the sense of the acceleration signal is opposed to the sense of the resultant of the displacement and velocity signals, the voltages across the limiting devices $V_6$, $V_7$ and $V_8$, $V_9$ become substantially equal and opposite, whereby a voltage is applied to the primary winding of transformer $T_7$ and a negative bias is applied to the control electrodes of the tubes $V_3$, $V_4$, rendering the tubes non-conducting. If the sense of the acceleration signal is the same as the sense of the resultant of the displacement, and velocity signals, the voltage across limiting devices $V_6$, $V_7$ and $V_8$, $V_9$ become equal and in the same sense, so that no voltage is applied to the primary winding of transformer $T_7$, nor to the control electrodes of tubes $V_3$, $V_4$, which are then conducting.

Figure 3:
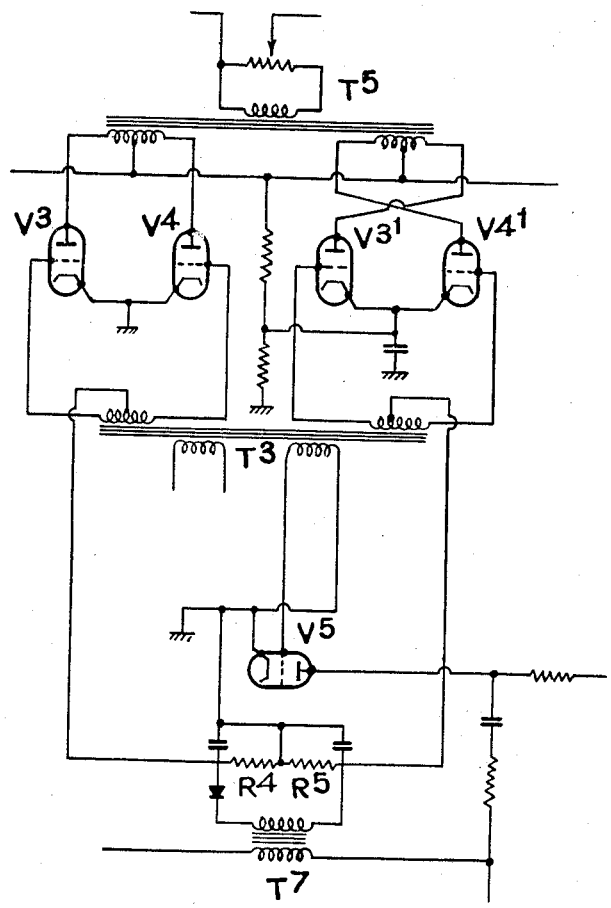
Figure 3 illustrates a modification of the system of Figure 2, according to which a reversed acceleration term is included in the control quantity when the acceleration term is in the opposite sense to the resultant of the displacement and velocity term.

Figure 3 of the drawings shows a modification of the arrangement shown in Figure 2. A second pair of push-pull tubes $V_3'$ $V_4'$ is added in parallel with the acceleration signal amplifier $V_3$, $V_4$. The control electrodes of these tubes $V_3'$, $V_4'$ are fed from a second additional centre-tapped winding on transformer $T_3$, and their anodes are connected to a second additional centre-tapped winding on transformer $T_5$ but in the reverse sense to that used with the tubes $V_3$, $V_4$. When the acceleration signal has the same sense as the resultant of the displacement and velocity signals, the tubes $V_3'$ $V_4'$ are biased beyond cut-off, and the acceleration signal is passed to transformer $T_5$ by the tubes $V_3$, $V_4$. When the acceleration signal has the opposite sense to the said resultant, however, the rectifier associated with transformer $T_7$ applies a negative bias to the control electrodes of the tubes $V_3$, $V_4$ and a positive bias to those of the tubes $V_3'$ $V_4'$. This causes the former tubes to cut-off and the later to conduct, whereby the acceleration signal is supplied to the transformer $T_5$ reversed in sign.

I claim:

1. An automatic control system for dirigible craft comprising supervising instruments sensitive respectively to the deviation, angular velocity and angular acceleration of the craft, a signal producing apparatus associated with each instrument and adapted to deliver a control quantity dependent on the indication of that instrument, means for totalising the several control quantities delivered by the signal apparatus, means for controlling the deflection of a rudder or other control surface in accordance with the total control quantity thus obtained and means for preventing operation of the signal apparatus associated with the acceleration-sensitive instrument when its effect would be to oppose the action of at least one of the remaining signals.

2. In an automatic system for controlling the motion of a dirigible craft about an axis in order to maintain a desired attitude by causing a control surface to be deflected in a manner determined by a control signal made up of a plurality of control terms, means for generating such control terms dependent respectively on the displacement, angular velocity and the angular acceleration of the craft about the axis of control, a servo motor for controlling said surface, summation means adding the acceleration term to the other terms for controlling said motor, whereby the angular acceleration term is rendered operative to oppose the angular acceleration of the craft away from its desired attitude at the beginning of a departure, and means for preventing said angular acceleration term from opposing the other terms during angular motion of the craft back towards its desired attitude.

3. In an automatic pilot for craft, means for generating a signal proportional to deviation of the craft from course, means for producing a second signal proportional to the rate of such deviation, means for producing a third signal proportional to the rate of change or acceleration of such deviation, a servo motor normally controlled by the summation of such signals, and means for reducing the effect of said acceleration signal when the velocity of approach to the desired course is diminishing.

4. In an automatic pilot for aircraft, means for generating a signal proportional to deviation of the craft from course, means for producing a second signal proportional to the rate of such deviation, means for producing a third signal proportional to the rate of change of such deviation, a servo motor normally controlled by the summation of such signals, and means for reducing the effect of said acceleration signal when such acceleration signal would act to oppose the velocity reducing signal as the craft returns to course after a deviation.

5. In a positional control system for causing a controlled object to follow the position of a controlling object, means for generating a signal proportional to the error in the position of said objects and means for producing a second signal proportional to the rate of change of such error, means for producing a third signal proportional to the acceleration term of such error, a servo motor positioning said object, means for normally controlling said motor from a combination of said signals, and means for eliminating the acceleration signal when the acceleration occurs during approach of said objects to synchronism.

6. In a positional control system for causing a controlled object to follow the position of a controlling object, means for generating a signal proportional to the error in the position of said objects and means for producing a second signal proportional to the rate of change of such error, means for producing a third signal proportional to the acceleration term of such error, a servo motor positioning said object, means for normally controlling said motor from a combination of said signals, and means for eliminating the acceleration signal when the acceleration is opposite in sense to the rate of change of error.

7. An automatic control system according to claim 1, wherein each signal is also reversible according to the sense of the indication of the supervising instrument, and cut out means operative whenever an acceleration signal is opposite to that of either the displacement or velocity signal for preventing such acceleration signal from affecting the rudder controlling means.

8. In an automatic pilot for craft, means for generating a signal proportional to deviation of the craft from course, means for producing a second signal proportional to the rate of such deviation, means for producing a third signal proportional to the rate of change or acceleration of such deviation, a servo motor normally controlled by the summation of such signals, relay means for temporarily eliminating the effect of said acceleration signal controlled by both the displacement and velocity signals, and selective manual means for eliminating the control of said relay means by either of said displacement or velocity signals.

9. In a positional control system for causing a controlled object to follow the position of a controlling object, means for generating a signal proportional to the error in the position of said objects and means for producing a second signal proportional to the rate of change of such error, means for producing a third signal proportional to the acceleration term of such error, a servo motor positioning said object, and means for normally controlling said motor from a combination of said signals, and sense responsive relays for eliminating acceleration signal when it is opposite to either the displacement or velocity signal.

ARTHUR PHILIP GLENNY.

REFERENCES CITED

The following references are of record in the file of this patent:

UNITED STATES PATENTS

| Number | Name | Date |
|---|---|---|
| 1,703,280 | Minorsky | Feb. 26, 1929 |
| 2,204,290 | Alkan | June 11, 1940 |
| 2,259,600 | Alkan | Oct. 21, 1941 |
| 2,293,889 | De Florez | Aug. 25, 1942 |